United States Patent [19]
Zaleski

[11] Patent Number: 4,870,527
[45] Date of Patent: Sep. 26, 1989

[54] GROUND FAULT PROTECTION SYSTEM

[75] Inventor: Stephen J. Zaleski, Tonawanda, N.Y.

[73] Assignee: Emerson Electric Company, St. Louis, Mo.

[21] Appl. No.: 157,163

[22] Filed: Feb. 11, 1988

Related U.S. Application Data

[63] Continuation of Ser. No. 857,973, May 1, 1986, abandoned.

[51] Int. Cl.$^4$ .......................... H02H 3/16; H02H 3/32
[52] U.S. Cl. .......................................... 361/44; 361/45; 361/47; 361/49
[58] Field of Search .................. 336/182, 183, 144; 361/44, 45, 46, 47, 48, 49, 50, 42; 363/56, 37, 50, 51

[56] References Cited

U.S. PATENT DOCUMENTS

| | | | |
|---|---|---|---|
| 1,866,751 | 7/1932 | Bütow | 361/87 X |
| 4,053,815 | 10/1977 | Sircom | 361/42 |
| 4,080,640 | 3/1978 | Elms et al. | 361/45 |
| 4,159,499 | 6/1979 | Bereskin | 361/42 |
| 4,287,545 | 9/1981 | Mayer | 361/44 |
| 4,320,444 | 3/1982 | Häusler et al. | 363/51 X |
| 4,683,513 | 7/1987 | Miller | 361/44 X |

FOREIGN PATENT DOCUMENTS 2454198 11/1980 France .................................. 361/44

*Primary Examiner*—A. D. Pellinen
*Assistant Examiner*—H. L. Williams
*Attorney, Agent, or Firm*—Lyon & Lyon

[57] ABSTRACT

A ground fault detector employs a current feedback loop which makes use of a differential current sensing configuration to in essence increase the gain of the current feedback signal, thereby lowering the detector trip level when ground fault currents are present. In a preferred embodiment, ground faults are detected in a circuit having an AC-to-AC converter and a useful load by positioning a differential sensing configuration in the DC link of the AC-to-AC converter.

12 Claims, 1 Drawing Sheet

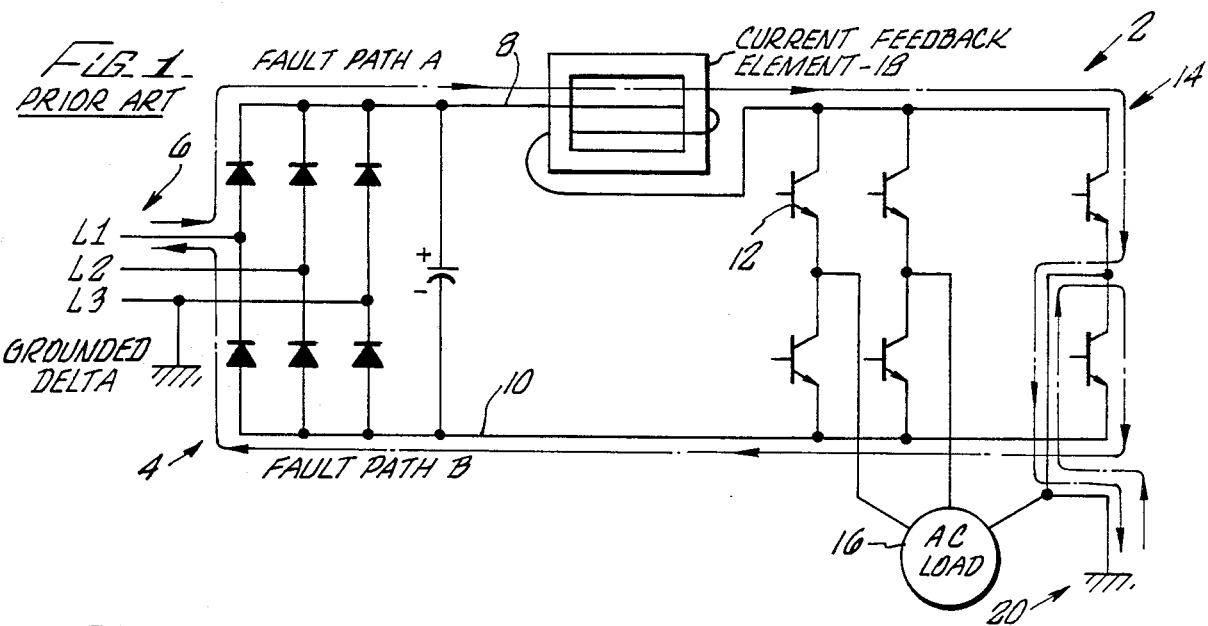
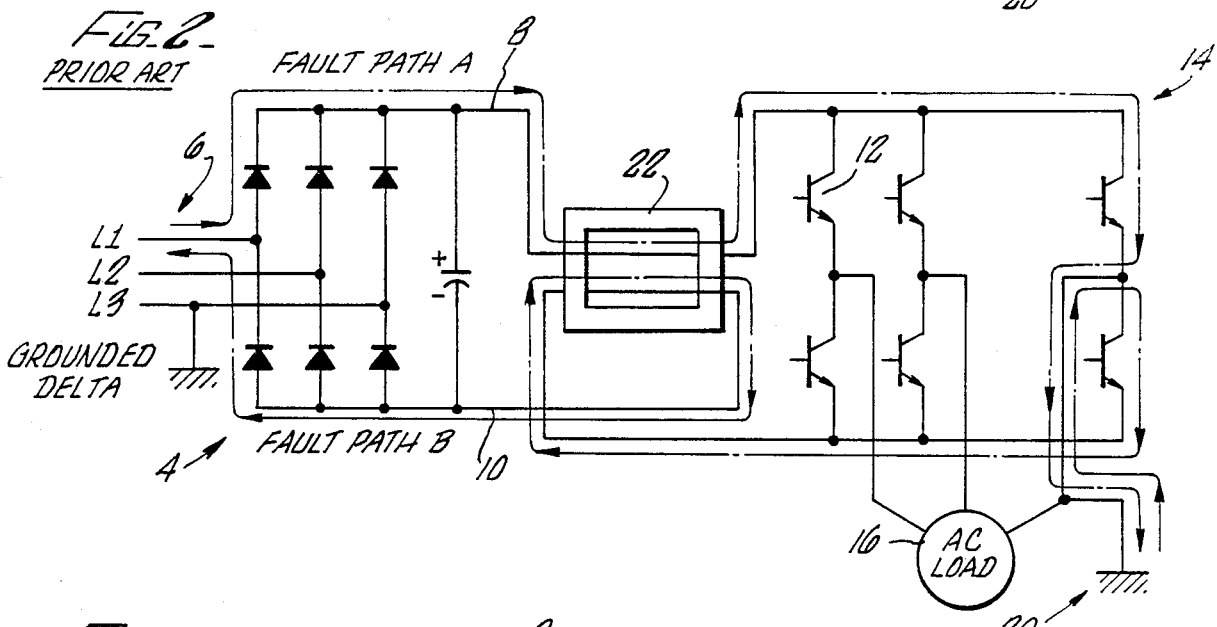
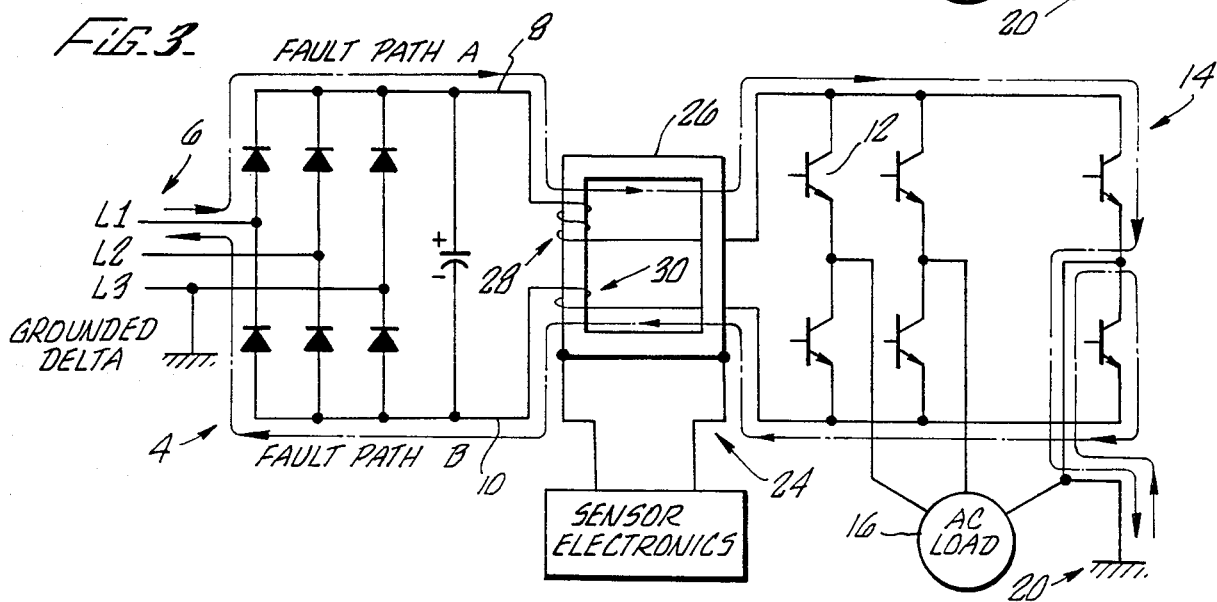

//4,870,527

GROUND FAULT PROTECTION SYSTEM

This is a continuation of application Ser. No. 857,973, filed 5-1-86, now abandoned.

TECHNICAL FIELD

The present invention generally relates to ground fault protection systems for use with AC-to-AC converters such as AC motor controllers, UPS systems and brushless DC motor controllers. The present invention is specifically directed to a ground fault detection system which utilizes a differentially configured current sensing element connected between the converter rectifier and inverter to protect the inverter bridge transistors from failure in the event of an earth ground fault at the converter output.

BACKGROUND ART

Two basic types of ground fault sensing systems for sensing ground fault currents in AC-to-AC converter circuits have heretofore been developed. The first such prior art system typically employs an input or output ground fault transformer which is somewhat complicated and thus inherently adds significant cost to the overall controller. The second type of prior art ground fault detector conventionally employs a current sensing element such as a Hall effect device in the DC link between the controller bridge rectifier and the DC-to-AC converter. DC link current feedback sensing configurations, however, suffer from either an inability to detect all possible ground current conditions or from larger than desired current trip levels. It would accordingly be of great benefit to have available a ground fault current detector which is capable of effectively detecting ground fault conditions in alternating-polarity control systems at low current trip levels while making use of inexpensive circuit components.

It is therefore an object of the present invention to provide a ground fault detector for use with alternating polarity power supply systems.

It is a further object of the present invention to provide a ground fault detector for AC-to-AC converters, wherein the ground fault detector makes use of inexpensive circuit components which detect ground faults in the AC-to-AC converter circuitry at low ground fault current trip levels.

It is yet another object of the present invention to provide a ground fault detector for AC-to-AC converters, wherein the ground fault current detector relies upon current feedback from the converter DC link to supply an indication of ground fault conditions at current trip levels low enough to enable controller shutdown to occur before the AC-to-AC converter power transistors are damaged.

These and other objects of the present invention are achieved in a ground fault detector employing a current feedback loop which makes use of a differential current sensing configuration to in essence increase the gain of the current feedback signal, thereby lowering the detector trip level when ground fault currents are present. One embodiment of the present invention designed for AC-to-AC converters positions the differential sensing configuration in the DC link of the AC-to-AC converter circuitry.

The various features, objects and advantages of the present invention will become more apparent upon consideration of the following Best Mode For Carrying Out The Invention in conjunction with the drawings, wherein:

FIG. 1 illustrates one type of prior art ground fault detector for use in AC-to-AC converters;

FIG. 2 illustrates a second type of prior art ground fault detector for use in AC-to-AC converters;

FIG. 3 illustrates the differential current sensing configuration of the present invention.

BEST MODE FOR CARRYING OUT THE INVENTION

Two conventional types of AC-to-AC converter ground fault detectors may be seen in FIGS. 1 and 2. The AC-to-AC converter 2 itself includes a bridge rectifier 4 connected to a three-phase input mains 6. Positive and negative DC current links 8, 10 respectively supply the power transistors 12 of an inverter bridge 14 with the output of rectifier 4. The inverter bridge 14 is connected to an AC load 16 such as a drive motor which receives alternating current output from the bridge inverter. In FIG. 1, a ground fault detector 18 comprising a current feedback element, e.g., a hall effect current sensor, is placed in the DC link 8 between bridge rectifier 4 and bridge inverter 14. The current feedback element 18 may, for example, exhibit an effective turns ratio of two. When a ground fault condition arises in the AC load 16, as indicated at 20 in FIG. 1, two fault current paths through the AC-to-AC converter 2 result. The first such fault current path, indicated with a dotted line labled "Fault Path A" in FIG. 1, is established through the positive DC link 8 joining bridge rectifier 4 and bridge inverter 14. The second such path, indicated with the dotted line labeled "Fault Path B" in FIG. 1, is established through the negative DC link 10 joining the bridge rectifier and the bridge inverter. As is immediately apparent from FIG. 1, current feedback element 18 can only detect ground fault current in Fault Path A. Ground fault current passing through Fault Path B contributes nothing to the feedback signal from current feedback element 18.

In order to remedy the deficiencies of the ground fault detector arrangement depicted in FIG. 1, a sensor 22 comprising a current feedback element 22 is placed in both the positive and the negative DC links 8, 10 of the AC-to-AC converter 2, as seen in FIG. 2. Although the ground current feedback loop of the ground fault detector embodied in FIG 2 is capable of detecting ground falt currents flowing through either Fault Path A or Fault Path B. The current trip level for both Fault Path A and Fault Path B will be higher than the current trip level for the converter as a whole under normal load conditions. This is because current flows through the sensor in the same direction for both fault paths. Consequently, the effective number of current sensing turns in the current feedback element is determined by taking the sum of the number of turns in each fault path. The effective turns ratio for each fault path individually is thus less than the effective turns ratio under normal operating conditions.

The turns ratio relationships for sensor 22 can be illustrated as follows. If $N_a$ represents the number of turns in the current feedback element 22 across Fault Path A and $N_b$ represents the number of turns in current feedback element 22 across Fault Path B, the effective turns ratio $N_e$ for the current feedback element is equivalent to the sum of $N_a$ and $N_b$. That is:

$$N_e = N_a = N_b \qquad (1)$$

$$N_a < N_e \tag{2}$$

$$N_b < N_e \tag{3}$$

The effective gain of the current feedback loop across Fault Path A is determined by taking the ratio of $N_a$ to $N_e$, or;

$$g_a = N_a/N_e \tag{4}$$

Similarly, the effective gain of the current feedback loop across Fault Path B can be determined by taking the ratio of $N_b$ to $N_e$ or;

$$g_b = N_b/N_e \tag{5}$$

Substituting Equation (1) in Equations (2) and (3) yields:

$$g_a = N_a/[N_a + N_b] \tag{6}$$

$$g_b = N_b/[N_a + N_b] \tag{7}$$

Assuming the number of turns across Fault Path A in current feedback element 22 is the same as the number of turns across Fault Path B in current feedback element 22, i.e., assuming $N_a = N_b$, Equations (4) and (5) can be reduced as follows:

$$g_a = N_a/[N_a + N_a] = \tfrac{1}{2} \tag{8}$$

$$g_b = N_b/[N_b + N_b] = \tfrac{1}{2} \tag{9}$$

Hence, it can be seen that the effective gain of the current feedback loop across both Fault Path A and Fault Path B for the current feedback element 22 configured as shown in FIG. 2 is reduced two-fold. Consequently, detection of a selected level of load current requires a feedback current having a level twice that of the selected load current level. Assuming a gain of one within the current sensor, this means that current feedback element 22 will not sense a fault condition until the fault current flowing through either Fault Path A or Fault Path B reaches a level twice that of the maximum continuous current rating $I_{cmax}$ of the inverter bridge transistors 12. Such a condition would be acceptable if the AC-to-AC converter 2 could be shut-down instantaneously. However, inherent transport delays in the base drive circuits of power transistors 12 and the fault circuit established by the ground fault render instantaneous controller shut-down impossible. Hence, the reliability of the ground fault sensing configuration in FIG. 2 is seriously impaired.

The deficiencies of the prior art ground fault detectors discussed above are overcome with the ground fault detector of the present invention. Turning to FIG. 3, a current sensor 24 with a differentially configured current feedback element 26 can be seen. Current feedback element 26, like current feedback element 22 in FIG. 2, is connected across both the positive and negative DC links 8, 10 between bridge rectifier 4 and inverter bridge 14. Unlike current feedback element 22, however, the current sensitive windings 28 which forms the feedback loop across Fault Path A have a different number of turns than the current sensitive windings 30 which form the current feedback loop across Fault Path B in current feedback element 26. Using the aforementioned configuration, current sensitive windings 28 in essence function in subtractive rather than additive fashion, because the current flow through the sensor from Fault Path A is opposite to that through Fault Path B. Preferably, $N_a$ and $N_b$ are both also greater than $N_e$. Mathematically speaking:

$$N_a > N_b \tag{10}$$

The effective turns ratio for current feedback element 26 during normal operating conditions is thus:

$$N_e = N_a - N_b \tag{11}$$

where $N_a > N_e$ and $N_b > N_e$. The effective gain $g_a$ of the current feedback loop across Fault Path A becomes:

$$g_a = N_a/N_e \tag{12}$$

while the effective gain $g_b$ from the current feedback loop across Fault Path B in current feedback element 26 becomes:

$$g_b = N_b/N_e \tag{13}$$

The feedback current level $I_{fbA}$ for Fault Path A may then be expressed as:

$$I_{fbA} = I_{cmax}/g_a \tag{14}$$

$$I_{fbA} = [N_e/N_a] \times I_{cmax} \tag{15}$$

$$I_{fbA} = [(N_a - N_b)/N_a] \times I_{cmax} \tag{16}$$

$$I_{fbA} = [(N_a/N_a) - (N_b/N_b)] \times I_{cmax} \tag{17}$$

$$I_{fbA} = [1 - (N_b/N_a)] \times I_{cmax} \tag{18}$$

The feedback current level $I_{fbB}$ for Fault Path B through current feedback element 26 can be computed:

$$I_{fbB} = I_{cmax}/g_b \tag{19}$$

$$I_{fbB} = I_{cmax} \times [N_e/N_b] = I_{cmax} \times [(N_a/N_b) - (N_b/N_b)] \tag{20}$$

$$I_{fbB} = I_{cmax} \times [(N_a/N_b) - 1] \tag{21}$$

For either fault path, it can be seen that as long as $N_a > N_b$ the feedback current level $I_{fb}$ is less than $I_{cmax}$. Hence, with suitable adjustment of the voltage trip level for current feedback element 26, the current level at which the ground fault detector will trip out to signal a ground fault-initiated overcurrent condition can be established at a value well below the desired maximum load current level. System shut-down can in turn be initiated sufficiently far in advance of the point at which transport delays cause the actual current to reach or exceed the desired maximum load current level, thereby preventing damage to the inverter bridge transistors 12.

EXAMPLE 1

The working of the ground fault detector of FIG. 3 can be better illustrated by way of a concrete example. Assume at the maximum load current level $I_{cmax}$ for invertor bridge transistors 12 is 50 amperes. Further assume that current feedback element 26 is rated at 100 amperes and the current sensor 24 is designed to provide a one volt output at 100 amps. The relationship between the voltage output of current sensor 24 and the current flow through current feedback element 26 can be expressed as:

$$V_{out}=[K]\times[N_e]\times[I_{load}] \quad (22)$$

where $N_e$ is the effective turns ratio for current feedback element 26, $I_{load}$ is the load current through the positive and negative DC links 8-10 between bridge rectifier 4 and invertor bridge 14, and K is a scaling constant. Because current sensor 24 is designed with a one volt output at 100 amperes, $$K=1 \ V/100 \ \text{amp-turn} \quad (23)$$

The effective turns ratio $N_e$ required for the current feedback element 26 of the present Example can be determined by solving Equation (20) for normal load conditions.

$$V_{out}=1=[1/100]\times[50 \ \text{amp}]\times[N_e] \quad (24)$$

$$N_e=100 \ \text{amp-turns}/50 \ \text{amp}=2 \ \text{turns} \quad (25)$$

Now assume that under fault conditions, current sensor 24 will reach its one volt trip level when the ground fault current through a selected one of the two Fault Paths A or B is less than or equal to 10 amperes. Choosing Fault Path B as the representative fault path for which ground faults of 10 amperes or less will cause the current sensor to trip, $I_{faultB}>>I_{faultA}$ and:

$$V_{out}=[K]\times[N_b]\times[I_{load}]=[K]\times[N_b]\times[I_{faultB}] \quad (26)$$

$$1 \ \text{volt}=[1V/100 \ \text{amp-turn}]\times[10 \ \text{amp}]\times[N_b] \quad (27)$$

$$N_b=100 \ \text{amp-turn}/10 \ \text{amp}=10 \ \text{turns} \quad (28)$$

Recalling that the effective turns ratio $N_e=N_a-N_b$, $$N_a=N_e+N_b \quad (29)$$

$$N_a=2+10=12 \ \text{turns} \quad (30)$$

The overcurrent trip level, i.e., the level of fault current causing current sensor 24 to generate a trip voltage of one volt, is 10 amperes for ground faults which occur on the negative side of the load through bridge inverter 14:

$$I_{faultB}>>I_{faultA} \quad (31)$$

$$V_{out}=[K]\times[N_b]\times[I_{faultB}] \quad (32)$$

$$I_{faultB}=V_{out}/KN_b=1/[(1/100)\times 10] \quad (33)$$

$$I_{fault}=10 \ \text{amperes} \quad (34)$$

The fault current $I_{faultA}$ causing current sensor 24 trip out during the occurrence of a ground fault on the positive side of the AC-to-AC converter load is computed as follows:

$$I_{faultA}>>I_{faultB} \quad (35)$$

$$V_{out}=[K]\times[N_a]\times[I_{faultA}] \quad (36)$$

$$I_{faultA}=V_{out}/KN_a=1V/[(1/100)\times 12] \quad (37)$$

$$I_{faultA}=100/12=8.33 \ \text{amperes} \quad (38)$$

The present invention has been set forth in the form of one preferred embodiment. It is nevertheless intended that modifications to the ground fault protection system disclosed herein may be made by those skilled in the art without departing from the scope and spirit of the present invention. Moreover, such modifications are considered to be within the purview of the appended claims.

What is claimed is:

1. A system for detecting ground fault conditions in a circuit having AC-to-AC converter means and means for operative connection of a useful load;

said AC-to-AC converter means having bridge rectifier means for supplying current, inverter bridge means for supplying alternating current output from said bridge rectifier means, and two current path means for opposite polarity for transmitting power between said bridge rectifier means and said inverter bridge means;

said system comprising first winding means for sensing current in one of said two current path means, said first winding means having a first predetermined number of windings disposed across said one of said two current path means;

second winding means for sensing current in another one of said two current path means, said second winding means having a second predetermined number of windings not equal to said first predetermined number of windings disposed across said another one of said two current path means; and differential transformer means for generating a signal responsive to a difference in current sensed by said first and second winding means.

2. A system as in claim 1, wherein said current path means are DC current paths.

3. A system as in claim 1, wherein said signal generated by said differential transformer comprises a DC voltage signal.

4. A system as in claim 1, wherein said signal generated by said differential transformer comprises a first signal component proportional to normal load current; and a second signal component proportional to ground fault current.

5. A system as in claim 1, wherein said differential transformer means comprises a single core across which said first and second winding means are disposed.

6. A ground fault protection system for detecting ground faults in a circuit having an AC-to-AC converter and a load, the AC-to-AC converter having a rectifier connected to an inverter via two converter current paths of opposite polarity, said ground fault protection system comprising current feedback means for differentially detecting ground fault-induced current flow through the two current paths connecting the AC-to-AC converter rectifier and inverter, said current feedback means including a first winding means disposed across one of the two converter current paths in order to sense current flow therethrough, said first winding means having a first predetermined number of windings, said current feedback means also including a second winding means disposed across the remaining one of the two converter current paths in order to sense current flow therethrough, said second winding means having a second predetermined number of windings which is different than said first predetermined number of windings.

7. A ground fault protection system for detecting ground fault conditions in a circuit having an AC-to- AC converter and a useful load, said AC-to-AC converter having bridge rectifier means for supplying current, inverter bridge means for supplying alternating current output from said bridge rectifier means, and two current path means of opposite polarity for transmitting power between said bridge rectifier means and said inverter bridge means, said ground fault protection system including differential transformer means for differentially detecting ground fault-induced current flow through said two current path means, wherein said differential transformer means includes first winding means having a first predetermined number of windings disposed across one of said two current path means for sensing current flow therethrough, and second winding means having a second predetermined number of windings different from said first predetermined number of windings disposed across said other of said two current path means for sensing current flow therethrough.

8. A circuit, comprising

AC-to-AC converter means including bridge rectifier means, two current path means operatively connected to said bridge rectifier means, and inverter bridge means operatively connected to said two current path means;

a useful load operatively connected to said inverter bridge means; and ground fault protection means for detecting ground fault conditions in said useful load, including differential transformer means for differentially detecting ground fault-induced current flow through said two current path means, said differential transformer means including first winding means having a first predetermined number of windings disposed across one of said two current path means for sensing current flow therethrough, and second winding means having a second predetermined number of windings not equal to said first predetermined number of windings disposed across said other of said two current path means for sensing current flow therethrough.

9. A circuit as in claim 6, comprising first and second primary windings disposed in opposite directions but with unequal numbers of turns; and sensor means for detecting differential current flow between said first and second primary windings.

10. A circuit as in claim 6, comprising current feedback element means;

first winding means disposed across a first region of said current feedback element means;

second winding means disposed across a second region of said current feedback element means in an opposite direction from said first winding means, said second winding means having a different number of windings than said first winding means; and sensor means disposed across a third region of said current feedback element means.

11. A circuit as in claim 6, comprising means for generating a ground fault detection signal, said signal including a first signal component proportional to normal load; and a second signal component proportional to ground fault current.

12. A circuit as in claim 11, wherein said first and second signal components have unequal amplification.

* * * * *